United States Patent [19]
Arai et al.

[11] Patent Number: 4,627,040
[45] Date of Patent: Dec. 2, 1986

[54] OPTICAL DISK TRACKING APPARATUS

[75] Inventors: Shigeru Arai, Zushi; Itaru Shibata, Tokyo; Akira Minami; Koichi Ogawa, both of Yokohama, all of Japan

[73] Assignee: Fujitsu Limited, Kawasaki, Japan

[21] Appl. No.: 476,261

[22] Filed: Mar. 17, 1983

[30] Foreign Application Priority Data

Mar. 17, 1982 [JP] Japan ................................. 57-42231

[51] Int. Cl.$^4$ .............................................. G11B 7/00
[52] U.S. Cl. ........................................ 369/44; 369/46
[58] Field of Search ............... 358/342; 369/44–47; 250/201 DF

[56] References Cited

U.S. PATENT DOCUMENTS 3,854,015 12/1974 Janssen .
3,997,715 12/1976 Elliott .............................. 369/46 X
4,397,010 8/1983 Nabeshima ........................... 369/44
4,466,087 8/1984 Cheng ............................... 369/46 X

FOREIGN PATENT DOCUMENTS 2086092 5/1982 United Kingdom .

Primary Examiner—Robert L. Richardson
Attorney, Agent, or Firm—Staas & Halsey

[57] ABSTRACT

A tracking servo apparatus for controlling a position of a light beam to follow an information track on an information storage disk. In response to a drive signal, a light-deflection mechanism moves the light beam onto the disk transversely with respect to the information track. The photodetector detects the difference in the intensity of the light beam in half sections and produces a radial error signal. The radial error signal is corrected in response to the drive signal which is applied to the light-deflection mechanism, and then a new drive signal is produced depending upon the corrected radial error signal.

8 Claims, 10 Drawing Figures

4,627,040

OPTICAL DISK TRACKING APPARATUS

BACKGROUND OF THE INVENTION (1) Field of the Invention

The present invention relates to an apparatus for controlling the position of a light beam to follow an information track on an information storage disk of a recorded information reproducing system, and, more particularly, to a light beam position control apparatus using a push-pull tracking servo method.

(2) Description of the Prior Art

In general, a recorded information reproducing system is equipped with a tracking servo device to center a light beam on an information track on an information storage disk, such as an optical disk.

There are various methods for such control, e.g., the one-beam method, wobbling method, and three-beam method. One of the one-beam methods is the push-pull method. This method utilizes the light beam reflected and diffracted by pits on an optical disk; the pit depth being one-eighth the wavelength of the light beam from the light source in order to obtain the best diffraction. The far field of the reflected light beam is sectioned into two half-circles each of which is provided with a photoelectric transducer. These transducers, which together constitute a photodetector, are composed of photodiodes which generate signals indicative of the intensity of light in the half-circle. Deviation of the light beam from the information track creates a difference in the intensity of light in the two half-circles. Thus, a difference between the signals from the photodiodes indicates deviation of the light beam from the information track, in other words, indicates a radial error of the light beam. This difference of the signals from the photodiodes is used as a tracking servo signal in the push-pull tracking servo method. It is important to keep the reflected light beam centered on the photodetector to detect only the difference in the intensity of light in the two half-circles.

In the conventional push-pull tracking servo method, however, the position of the reflected light beam on the photodetector wobbles. The reason for this is that the optical axis of the light beam projected onto the optical disk through an objective lens is not always kept vertical with respect to the optical disk surface due to the displacement of a light-deflection mechanism, i.e., a galvano-mirror or a movable objective lens. Displacement of the galvano-mirror or objective lens moves the light beam projected onto the optical disk surface transversely with respect to the information track. If the light beam is not vertically projected onto the optical disk surface, the reflected light beam from the disk does not follow the same path of the beam projected onto the disk, causing the reflected light beam not to be centered on the photodetector. The false signal due to the deviation of the reflected light beam onto the photodetector combines with the correct tracking servo signal and makes accurate tracking servo operation difficult.

As a result, according to the conventional method, the amount of displacement of the light-deflection mechanism has to be limited so that the optical axis of the light beam projected onto the disk surface does not incline too much from a vertical position with respect to the disk surface. This makes the controllable radical error of the tracking servo mechanism extremely small.

SUMMARY OF THE INVENTION

It is, therefore, an object of the present invention to provide a light beam position control apparatus enabling an accurate and stabilized tracking servo operation.

Another object of the present invention is to provide a light beam position control apparatus enabling an accurate and stabilized tracking servo operation, which has a simple structure.

A further object of the present invention is to provide a light beam position control apparatus having a wide range of control of the tracking servo operation.

According to the present invention, there is provided a light beam position control apparatus comprising a light-deflection mechanism, such as a galvano-mirror or a movable objective lens, for moving the light beam projected onto an information storage device, such as an optical disk, transversely with respect to the information track in response to a drive signal. A photo detector means detects the intensity difference between half sections of the light beam reflected by the information storage device, to produce an error signal indicative of the radial error of the light beam with respect to the information track and a means for correcting the error signal in response to the displacement of the light-deflection mechanism produces a drive signal to be applied to the light-deflection mechanism.

The above and other related objects and features of the present invention will be apparent from the description of the present invention set forth below, with reference to the accompanying drawings.

DESCRIPTION OF THE PREFERRED EMBODIMENTS

Before describing the preferred embodiment of the present invention, an explanation is made of the deviation of the light beam position according to the prior art.

Figure 1A:
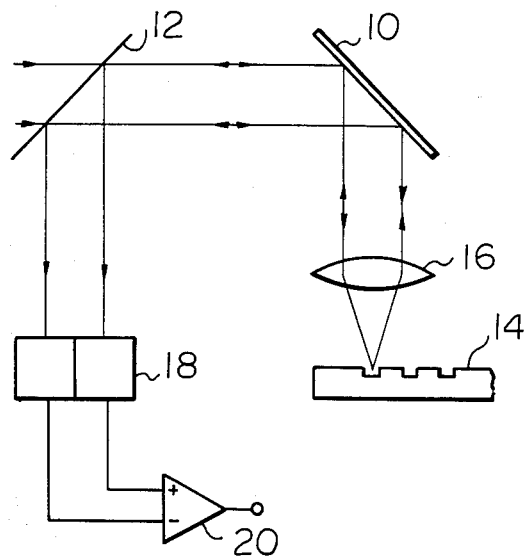
FIGS. 1a and 1b are schematic diagrams of the operation of the prior art.

As illustrated in FIG. 1a, a light beam from a light source is first reflected by a galvano-mirror 10 via a beam splitting prism 12 and is then focused onto an optical disk 14 by an objective lens 16. The light beam reflected from the disk 14 is reflected again by the galvano-mirror 10 via the lens 16.

Thereafter, the beam is reflected by the beam splitting prism 12 to a photodetector 18. In this case, the beam is vertically projected onto the disk surface, and the reflected beam follows the same path back to the beam splitting prism 12. Therefore, the reflected beam is centered on the photodetector 18 and an accurate radial error signal can be obtained from a differential amplifier 20 connected to the photodetector 18.

Figure 1B:
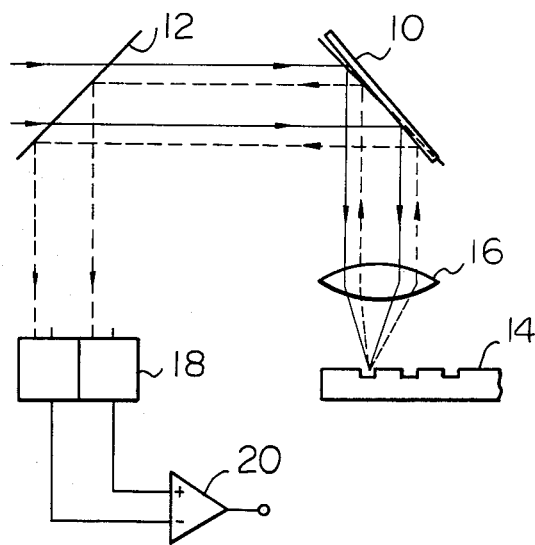

However, as illustrated in FIG. 1b, when the galvano-mirror 10 is displaced, the light beam is not vertically projected onto the disk surface. Thus the reflected beam from the disk 14 does not follow the same path of the beam projected onto the disk 14. Therefore, the reflected beam deviates from the center of the photodetector 18 causing the photodetector 18 and the differential amplifier 20 to produce a false radical error signal. As a result, according to the prior art, the movable angle of the galvano-mirror 10 has to be limited so that the light beam does not deviate much from the center of the photodetector 18.

Figure 2:
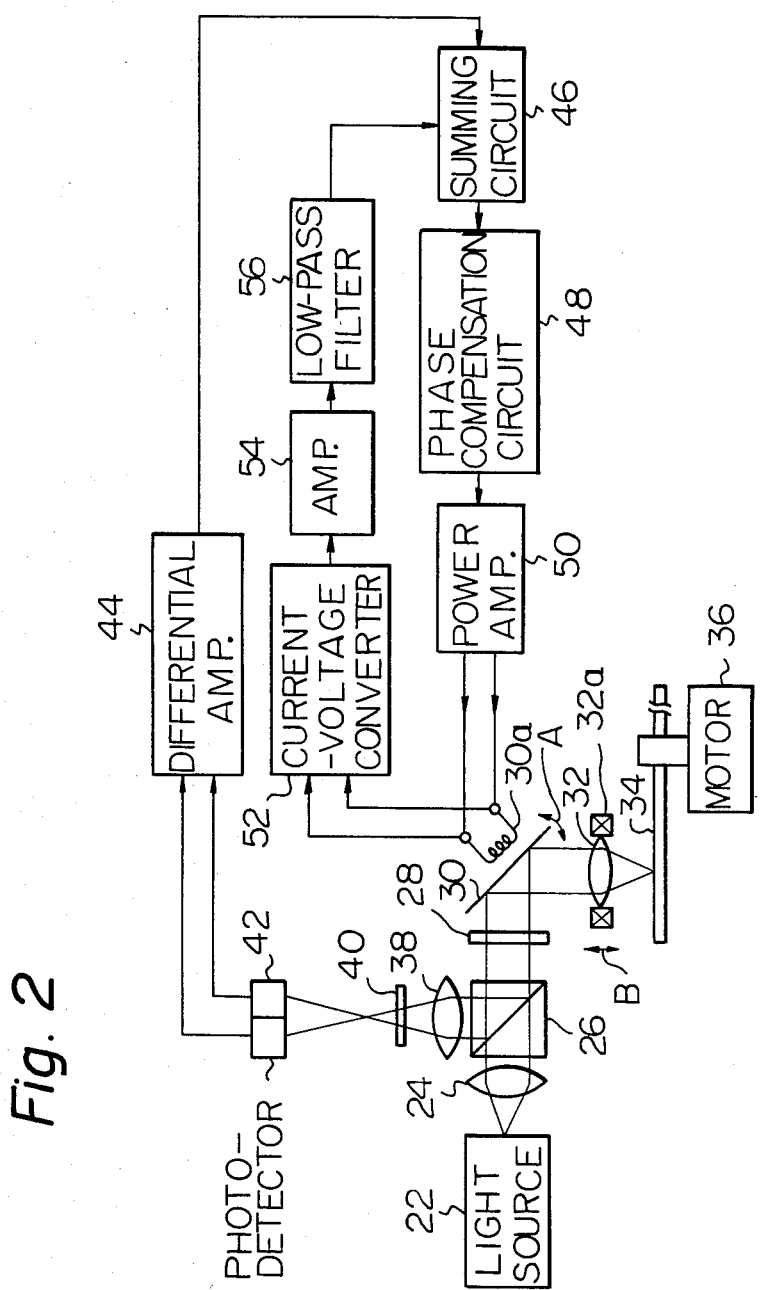
FIG. 2 is a circuit diagram of an embodiment according to the present invention.

FIG. 2 is one embodiment of the present invention. In FIG. 2, reference numeral 22 indicates a light source, such as a laser. The light beam from the light source 22 is transmitted through a lens 24, a beam splitting prism 26, and a quarterwave plate 28 to a galvano-mirror 30. Then the light beam is reflected by the galvano-mirror 30 and focused by an objective lens 32 onto an optical disk 34 rotated by a motor 36. The galvano-mirror 30 is pivotally mounted and movable by an angle as shown by an arrow A by means of a voice coil motor 30a to move the light beam radially across the disk 34. The galvano-mirror 30 in fact is oscillated by supplying a tracking servo signal to the voice coil motor 30a. Thus, the light beam can follow an information track on the disk 34.

The objective lens 32 is moved in directions shown by an arrow B to focus the light beam onto the surface of the disk 34 by means of a voice coil motor 32a driven by a focus servo signal.

On the optical disk 34, a spiral information track is formed. This track is composed of a succession of pits and islands disposed alternately along a spiral path. The pit depth is one-eighth the wavelength of the light beam from the light source 22.

A light beam reflected from the disk 34 is passed through the objective lens 32 and reflected again by the galvano-mirror 30 to the beam splitting prism 26 via the quarterwave plate 28. At the beam splitting prism 26, the reflected beam is further reflected and then passed through a lens 38 and a knife edge or a cylindrical lens 40 to a photodetector 42.

The photodetector 42 is composed of two or more photoelectric transducers, such as photodiodes for detecting the intensity of light in each of the two sectioned half-circles of the light beam. Signals from the photodetector 42 are fed to a differential amplifier 44 to obtain the difference between the signals. The output from the differential amplifier 44, which is equivalent to a radial error signal if there is no deviation of the light beam position on the photodetector 42, is applied to a summing circuit 46. The summed signal from the summing circuit 46 is applied via a phase compensation circuit 48, which is provided to improve servo control loop characteristics, to a power amplifier 50 to produce a drive current (tracking servo signal) for driving the voice coil motor 30a of the galvano-mirror 30.

A part of this drive current to be fed to the voice coil motor 30a is fed back to the summing circuit 46 via a feedback path which comprises a current-voltage converter 52, an amplifier 54, and a low-pass filter 56. The drive current is first converted into a voltage signal by the current-voltage converter 52, and then applied to the low-pass filter 56 via the amplifier 54. The signal passed through the low-pass filter 56 is applied to the summing circuit 46 and combined with the output from the differential amplifier 44.

Figure 3A:
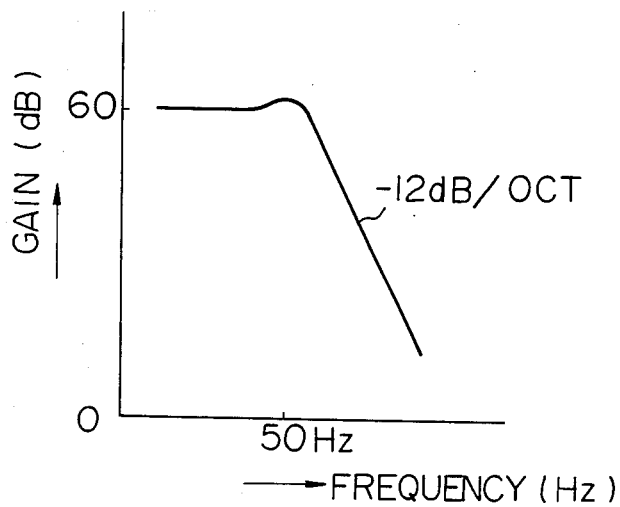
FIGS. 3a and 3b are graphs of the gain and phase characteristics with respect to frequency, of a low-pass filter of FIG. 2.
Figure 3B:
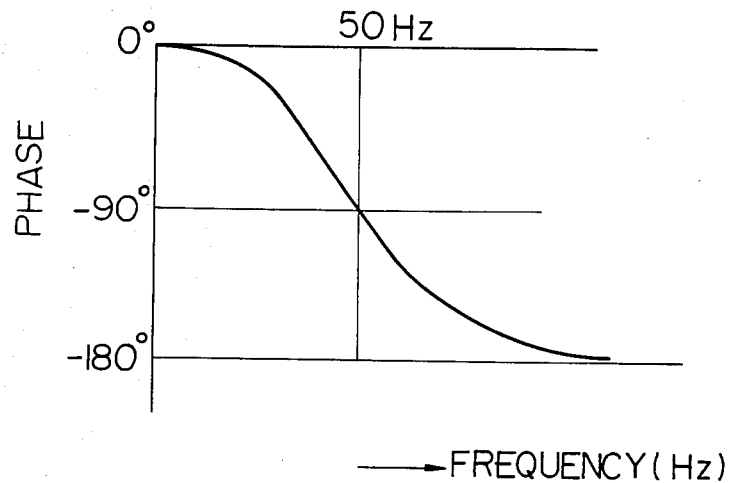

The low-pass filter 56 has the same gain-frequency and phase-frequency characteristics as those of the galvano-mirror system. In this embodiment, the low-pass filter 56 and also the galvano-mirror system have gain-frequency characteristics as shown in FIG. 3a. That is, the resonance frequency is about 50 Hz, and the gain is flat below 50 Hz. Thus above 50 Hz the gain decreases by 12 dB/oct. Furthermore, the low-pass filter 56 and the galvano-mirror system have phase-frequency characteristics as shown in FIG. 3b, where the phase is displayed by 90° at about 50 Hz. The gain-frequency and phase-frequency characteristics of glavano-mirror system can be obtained by calculation or by measurement. The deviation of the light beam from the center of the photodetector 42 corresponds to the displacement of the galvano-mirror 30. The displacement of the galvano-mirror 30 is recognized from the drive current applied thereto. Therefore, the deviation of the light beam position can be known from the galvano-mirror's drive current. However, since the galavano-mirror system has the above-mentioned gain and phase characteristics with respect to frequency, differences exist in the gain and phase between the drive current applied to the voice coil motor 30a and the displacement of the galvano-mirror 30. In order to eliminate these differences, the low-pass filter 56 having the same gain-frequency and phase-frequency characteristics as those of the galvano-mirror system is inserted in the feedback path. Accordingly, the signal from the low-pass filter 56 accurately indicates the deviation of the light beam position from the photodetector's center. This signal from the low-pass filter 56 is combined with and compensates for the output from the differential amplifier 44 at the summing circuit 46. The galvano-mirror 30 is displaced so that the light beam follows the information track and the light beam is always kept positioned on the center of the photodetector 42. Therefore, the photodetector 42 can always detect the actual radial error and can enable an accurate and stabilized tracking servo operation. Since the displacement of the galavano-mirror system is recognized from the drive current for driving the galvano-mirror system, accurate and stabilized tracking servo operation can be obtained without providing any additional photodetecting means. Furthermore, as the displacement of the galvano-mirror system causes no false radial error signal, the controllable range of the radial error of the tracking servo system can be extremely widened. For example, although the controllable radial error is limited to 50 $\mu$mpp according to the prior art, the present invention apparatus can increase this to 300 $\mu$mpp.

Figure 4:
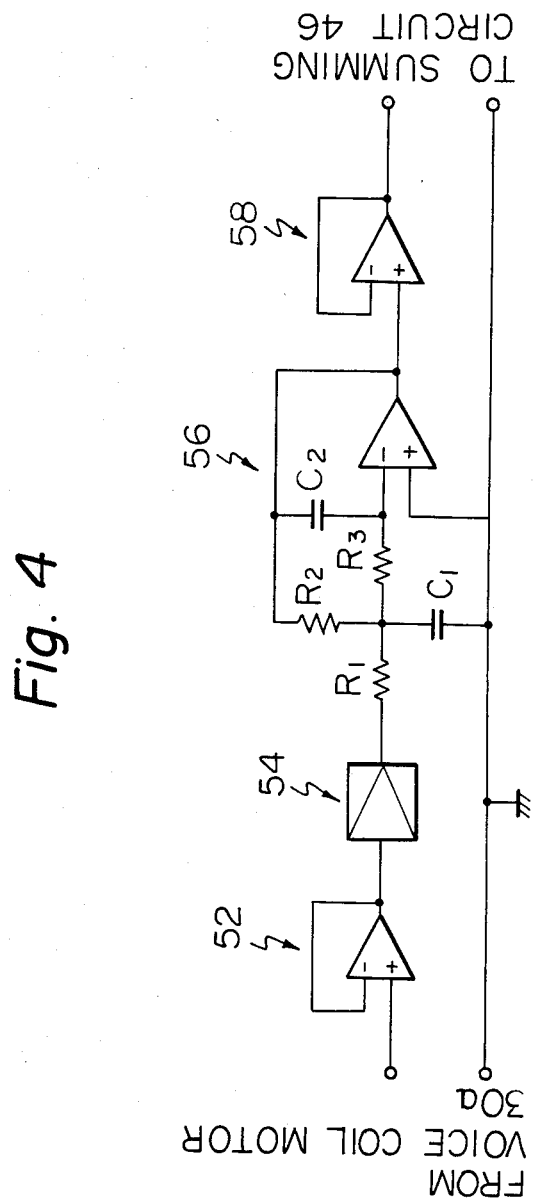
FIG. 4 consisting of (A)–(F) is a circuit diagram of the low-pass filter of FIG. 2.

FIG. 4 is a detailed example of the above-mentioned feedback path. In this example, the current-voltage converter 52 is composed of a buffer amplifier using an operational amplifier. The low-pass filter 56 is composed of a second-order active low-pass filter with a resonant frequency of 50 Hz, a pass band gain of 1.0, and a damping factor of 1.4. The resistance and capacitance values of each element of this active low-pass filter can be easily determined by known formulas to satisfy the above conditions. Next to the low-pass filter 56, a buffer amplifier 58 is connected in this example.

Figure 5:
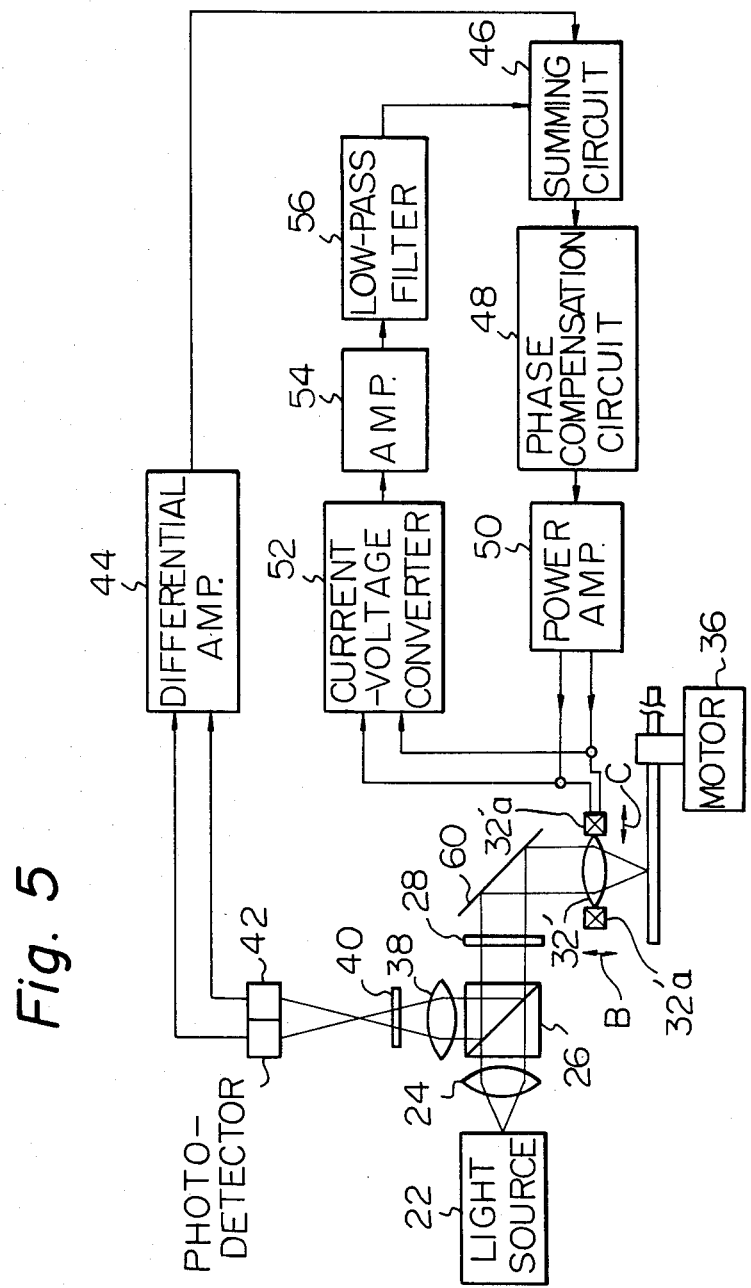
FIG. 5 is a circuit diagram of another embodiment according to the present invention.

FIG. 5 is another embodiment of the present invention. In this embodiment, a mirror 60 is fixed, but an objective lens 32' is movable in both directions, as shown by arrows B and C, by means of a voice coil motor 32a'. In other words, instead of the galvano-mirror 30 of FIG. 2 the objective lens 32' can move in the radial direction of the disk 34 in response to the drive current fed from the power amplifier 50. The other circuits and operations of this embodiment are the same as those of the first embodiment of FIG. 2.

Figure 6A:
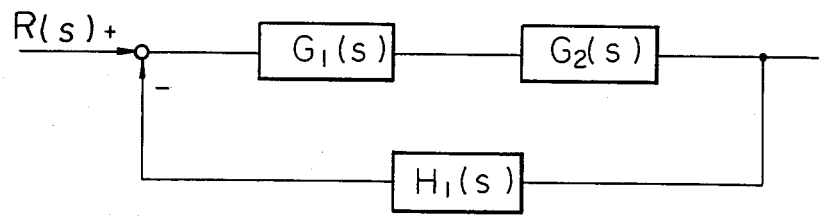
FIGS. 6a, 6b and 6c are block diagrams of the transfer characteristics of the apparatuses according to the prior art and the present invention.
Figure 6B:
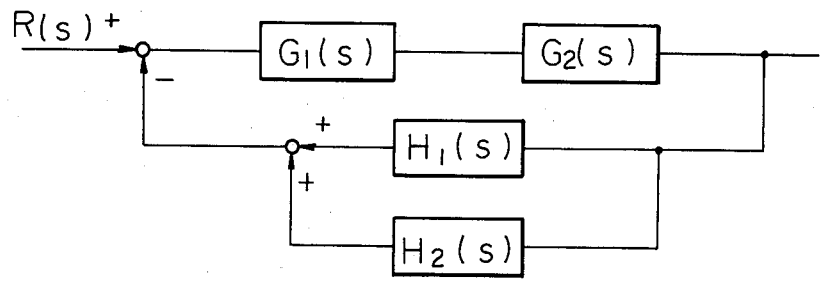
Figure 6C:
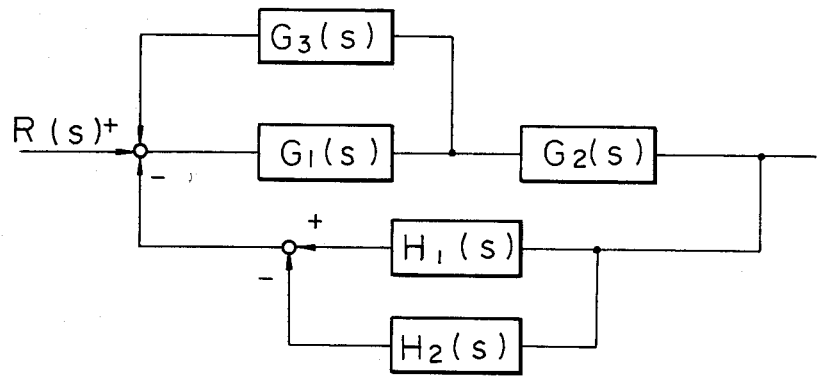

FIGS. 6a to 6c illustrate the transfer functions of the tracking servo apparatus according to the prior art and to the present invention.

The transfer function of a conventional closed-loop tracking control apparatus when the position of the light beam on a photodetector is centered is illustrated in FIG. 6a. In FIG. 6a, $G_1(s)$ depicts the transfer function of an electric circuit for driving a light-deflection mechanism, such as a galvano-mirror system or a movable objective lens system, $G_2(s)$ depicts the transfer function of the light-deflection mechanism, $H_1(s)$ depicts the transfer function of a photodetector for detecting a radial error, and $R(s)$ depicts a reference input corresponding to a desired value. Therefore, the closed-loop transfer function $T_0(s)$ of this tracking servo apparatus when the light beam position is centered can be represented by:

$$T_0(s) = \frac{G_1(s)G_2(s)}{1 + H_1(s)G_1(s)G_2(s)}$$

When the position of the light beam on the photodetector is not centered, the transfer function of the conventional closed-loop tracking servo apparatus is changed as shown in FIG. 6b. In FIG. 6b, $H_2(s)$ depicts the transfer function of the photodetector with respect to a false tracking error caused by the deviation of the light beam position on the photodetector. The transfer function $T_1(s)$ of FIG. 6b is represented by:

$$T_1(s) = \frac{G_1(s)G_2(s)}{1 + \{H_1(s) + H_2(s)\} G_1(s)G_2(s)}$$

On the other hand, the transfer function of the close-looped tracking servo apparatus according to the present invention is illustrated in FIG. 6c. In FIG. 6c, $G_3(s)$ depicts the transfer function of an electric circuit for correcting the error signal. The transfer function $T_2(s)$ of this apparatus shown in FIG. 6c is represented by:

$$T_2(s) = \frac{G_1(s)G_2(s)}{\{1 + H_1(s)G_1(s)G_2(s)\} + \{H_2(s)G_1(s)G_2(s) - G_1(s)G_3(s)\}}$$

In the above function, if the term $H_2(s)G_1(s)G_2(s)G_1(s)G_3(s)$ is eliminated, the transfer function $T_2(s)$ becomes equal to the transfer function $T_0(s)$ and accurate tracking servo operation can be expected. To eliminate this term, it is necessary to keep the following relationship between $G_3(s)$, $H_2(s)$, and $G_2(s)$:

$$G_3(s) = H_2(s)G_2(s)$$

Therefore, according to the embodiments of FIGS. 2 and 5 the electric circuit for correcting the error signal which has the transfer function $G_3(s)$ includes an electric filter with a transfer function equivalent to the transfer function $G_2(s)$ of the light-deflection mechanism.

Many different embodiments of the present invention may be constructed without departing from the spirit and scope of the present invention. It should be understood that the present invention is not limited to the specific embodiments described in this specification, except as defined in the appended claims.

What is claimed:

1. An apparatus for controlling a position of a light beam to follow an information track on an information storage device in dependence upon a drive signal, comprising:

light-deflection means, receiving the drive signal, for deflecting and splitting the light beam in half and for moving the split light beam projected onto the information storage device transversely with respect to the information track in response to the drive signal;

photodetector means, positioned in the path of the split light beam, for detecting the difference in intensity between each half of the light beam reflected from said information storage device, and for producing an error signal indicative of a radial error of the light beam with respect to the information track; and error correcting means, operatively connected to said light-deflection means and said photodetector means, for receiving said error signal and generating the drive signal to be applied to said light-deflection means in accordance with said error signal, and for correcting the error signal, said error correcting means including a circuit, operatively connected to receive the drive signal, for feeding back the drive signal to said error correcting means.

2. An apparatus as claimed in claim 1, wherein said error correcting means comprises:

low-pass filtering means, operatively connecting to said light-deflection means, for low-pass filtering a part of the drive signal which is applied to the light-deflection means and outputting a filtered signal, said error correcting means correcting said error signal in response to the filtered signal from said low-pass filtering means.

3. An apparatus as claimed in claim 1, wherein said light-deflection means comprises:

a movable mirror which can be pivotally moved, positioned in the path of the light beam, for reflecting and moving the light beam to the information storage device transversely with respect to the information track; and a mirror actuator, operatively connected to said movable mirror, for controlling the angle of said movable mirror in response to the drive signal.

4. An apparatus as claimed in claim 1, wherein said light-deflection means comprises:

a movable lens which can be moved transversely with respect to the information track, positioned in the path of the light beam, for transmitting and moving the light beam to the information storage device; and a lens actuator, operatively connected to said movable lens, for controlling the position of said movable lens in response to the drive signal.

5. An apparatus for controlling a position of a light beam to follow an information track on an information storage disk in dependence upon a drive signal, comprising:

a movable mirror means, operatively connected to receive the drive signal, for splitting the light beam in half and for reflecting and deflecting the light beam to the disk transversely with respect to the information track in response to the drive signal;

photodetector means, positioned in the path of the split light beam, for detecting the difference in intensity between each half of the light beam reflected from the information storage disk and for producing an error signal indicative of an error of the light beam with respect to the information track; and error correcting means, operatively connected to said movable mirror system, for correcting said error signal in response to the drive signal fed back from said movable mirror system and generating the drive signal to be applied to said movable mirror system, for correcting said error signal, said error correcting means including a circuit, connected between said error correcting means and said movable mirror means, the drive signal being fed back from said movable mirror means through said circuit to said error correcting means.

6. An apparatus as claimed in claim 5, wherein said error correcting means comprises:

low-pass filtering means, operatively connected to said movable mirror system, for low-pass filtering a part of the drive signal which is to be applied to said movable mirror system and outputting a filtered signal, said error correcting means correcting said error signal in response to the filtered signal from said low-pass filtering means.

7. An apparatus for controlling a position of a light beam to follow an information track on an information disk in dependence upon a drive signal, comprising:

a movable lens system, operatively connected to receive the drive signal, for splitting the light beam into half sections and for transmitting the split light beam to the information storage disk and deflecting the light beam from the information storage disk transversely with respect to the information track in response to the drive signal;

photodetector means, positioned in the path of the light beam, for detecting the difference in intensity between the half sections of the split light beam reflected by said information storage disk and producing an error signal indicative of an error of the light beam with respect to the information track; and error correcting means, operatively connected to said movable lens system, for correcting the error signal in response to the drive signal fed back from said movable lens system and generating the drive signal to be applied to said movable lens system, said error correcting means including:

low-pass filtering means, operatively connected to said movable lens system, for low-pass filtering a part of the drive signal which is to be applied to said movable lens system and outputting a filtered signal; and correcting means, operatively connected to said means for low-pass filtering and to said movable lens system, for correcting the error signal in response to the filtered signal from said low-pass filtering means and generating the drive signal applied to said movable lens system.

8. A light beam control apparatus including an optical disk and operatively connectable to receive a light beam, comprising:

a movable light-deflection mechanism, positioned in the path of the light beam, for deflecting the light beam across the optical disk;

a beam splitting prism, positioned in the path of the deflected light beam, for splitting the deflected light beam;

a photodetector, positioned in the path of the split, deflected light beam, for detecting the intensity of light in the split, deflected light beam and outputting intensity signals;

a differential amplifier, operatively connected to said photodetector, for receiving the intensity signals and outputting a differential signal corresponding to the difference in intensities of the intensity signals;

low-pass filtering means, operatively connected to said movable light deflection mechanism, for outputting a low-pass filtered signal;

a summing circuit, operatively connected to said differential amplifier and said low-pass filtering means, for receiving the differential signal and the low-pass filtered signal and providing a summed output signal;

a phase compensation circuit operatively connected to said summing circuit, for receiving the summed output signal and providing a phase compensation signal; and a power amplifier, operatively connected to said phase compensation circuit, for receiving the phase compensation signal and providing a drive current for moving said movable light-deflection mechanism accordingly.

* * * * *

UNITED STATES PATENT AND TRADEMARK OFFICE
CERTIFICATE OF CORRECTION

PATENT NO.   : 4,627,040
DATED        : DECEMBER 2, 1986
INVENTOR(S)  : SHIGERU ARAI ET AL.

It is certified that error appears in the above-identified patent and that said Letters Patent is hereby corrected as shown below:

Col. 4, line 14, "glavano-mirror" should be --the galvano-mirror--.

Col. 6, line 37, "connecting" should be --connected--.

Signed and Sealed this

Tenth Day of March, 1987

*Attest:*

DONALD J. QUIGG

*Attesting Officer*     *Commissioner of Patents and Trademarks*